United States Patent
Buravalla et al.

(10) Patent No.: US 9,091,252 B2
(45) Date of Patent: Jul. 28, 2015

(54) METHODOLOGY AND MECHANISMS FOR ENHANCING HIGH AMBIENT TEMPERATURE PERFORMANCE IN SHAPE MEMORY ALLOY APPLICATIONS

(71) Applicant: GM Global Technology Operations LLC, Detroit, MI (US)

(72) Inventors: Vidyashankar R. Buravalla, Bangalore (IN); Shivaram Ac, Bangalore (IN); Ashish Khandelwal, Bangalore (IN); Christopher B. Churchill, Venture, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 278 days.

(21) Appl. No.: 13/688,863

(22) Filed: Nov. 29, 2012

(65) Prior Publication Data

US 2014/0007572 A1 Jan. 9, 2014

(30) Foreign Application Priority Data

Jul. 9, 2012 (IN) .............................. 760/KOL/2012

(51) Int. Cl.
*F03G 7/06* (2006.01)

(52) U.S. Cl.
CPC ..................................... *F03G 7/065* (2013.01)

(58) Field of Classification Search
CPC ........................................................ F03G 7/065
USPC .............................. 60/527–529; 310/306–307
See application file for complete search history.

(56) References Cited

U.S. PATENT DOCUMENTS

| | | | |
|---|---|---|---|
| 4,484,955 A * | 11/1984 | Hochstein | 148/563 |
| 5,796,327 A | 8/1998 | Smith | |
| 8,205,445 B2 | 6/2012 | Browne et al. | |
| 8,436,571 B2 * | 5/2013 | Hao et al. | 318/631 |
| 8,741,076 B2 * | 6/2014 | Gao et al. | 148/402 |
| 2002/0044624 A1 | 4/2002 | Davis et al. | |
| 2004/0045364 A1 | 3/2004 | Davis et al. | |
| 2008/0022674 A1 * | 1/2008 | Brown et al. | 60/527 |
| 2011/0083431 A1 | 4/2011 | Mankame et al. | |
| 2011/0296826 A1 | 12/2011 | Pinto, IV et al. | |
| 2013/0011806 A1 | 1/2013 | Gao et al. | |
| 2013/0014501 A1 | 1/2013 | Brammajyosula et al. | |

* cited by examiner

*Primary Examiner* — Hoang Nguyen
(74) *Attorney, Agent, or Firm* — Harness, Dickey & Pierce, P.L.C.

(57) ABSTRACT

An actuator comprising an SMA element and a thermally responsive element that adjusts bias stress improves high ambient temperature operation.

8 Claims, 4 Drawing Sheets

METHODOLOGY AND MECHANISMS FOR ENHANCING HIGH AMBIENT TEMPERATURE PERFORMANCE IN SHAPE MEMORY ALLOY APPLICATIONS

FIELD

The present disclosure relates to control of actuators operating with shape-memory alloys.

BACKGROUND

This section provides background information related to the present disclosure that is not necessarily prior art.

Shape memory alloy (SMA) actuators are used for a wide range of applications. One typically application for SMA actuators is to perform limited displacements which generate work. In such displacement applications, the SMA actuator is typically in the form of a wire that transforms linear motion into incremental relative motion. When applying a current to the cold (low temperature or martensitic state) shape memory alloy (SMA) wire the temperature rises until the transformation temperature is reached (high temperature or austenite state) and due to a crystalline restructuring of the material, a contraction occurs. With such a contraction, force or torque is thus generated. However, it is to be appreciated that after the contraction, the SMA wire does not reset itself and therefore a counterforce has to bring the SMA wire into its original position. As the SMA wire cools it returns to its low temperature or martensitic state. The temperature at which the shape memory alloy remembers its high temperature form, referred to as the phase transformation temperature, can be adjusted by applying stress and other methods. In nickel-titanium shape memory alloys, for example, it can be changed from above about 100° C. to below about −100° C.

SMA actuators can be slow to reset or experience unintended actuations when the ambient temperature approaches and exceed the phase transformation temperature. The stress applied to a shape memory alloy element may be increased to increase its phase transformation temperature. However, this increase of stress reduces the fatigue life of the shape memory alloy. Not only does continuously operating the shape memory alloy at a higher actuation temperature result in a much shorter life cycle, but a device that is designed form a higher ambient temperature environment has a much shorter life cycle even if it rarely experiences those higher ambient temperatures. An SMA actuator must be designed to balance competing interests of lower temperature actuation to allow a longer life cycle and actuator performance at elevated ambient temperatures.

SUMMARY

This section provides a general summary rather than a comprehensive disclosure of the invention and all of its features.

An actuator having a shape memory alloy element with a first fixed end and a second end displaceable to selectively provide actuation output and a biasing element for the shape memory alloy element includes a connector that uses a thermally responsive element to alter bias stress in the actuator at high ambient temperatures. In various embodiments, the biasing element that engages or increases in stiffness at a pre-selected ambient temperature includes a thermally responsive element with a transition temperature of at least about 60° C. Nonlimiting examples of suitably thermally responsive elements are SMA wires, thermally active materials having a high coefficient of thermal expansion or phase change materials, and bimetallic elements.

In discussing the disclosed technology, "a," "an," "the," "at least one," and "one or more" are used interchangeably to indicate that at least one of the item is present; a plurality of such items may be present unless the context clearly indicates otherwise. All numerical values of parameters (e.g., of quantities or conditions) in this specification, including the appended claims, are to be understood as being modified in all instances by the term "about" whether or not "about" actually appears before the numerical value. "About" indicates that the stated numerical value or amount allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. In addition, disclosure of ranges includes disclosure of all values and further divided ranges within the entire range. The terms "comprises," "comprising," "including," and "having," are inclusive and therefore specify the presence of stated items, but do not preclude the presence of other items. As used in this specification, the term "or" includes any and all combinations of one or more of the associated listed items. When the terms first, second, third, etc. are used to differentiate various items from each other, these designations are merely for convenience and do not limit the items.

Further areas of applicability will become apparent from the description provided herein. The description and specific examples in this summary are intended for purposes of illustration only and are not intended to limit the scope of the present disclosure.

DRAWING

The drawing illustrates one aspect of the disclosed technology.

DETAILED DESCRIPTION

A detailed description of exemplary, nonlimiting embodiments follows.

Figure 1:
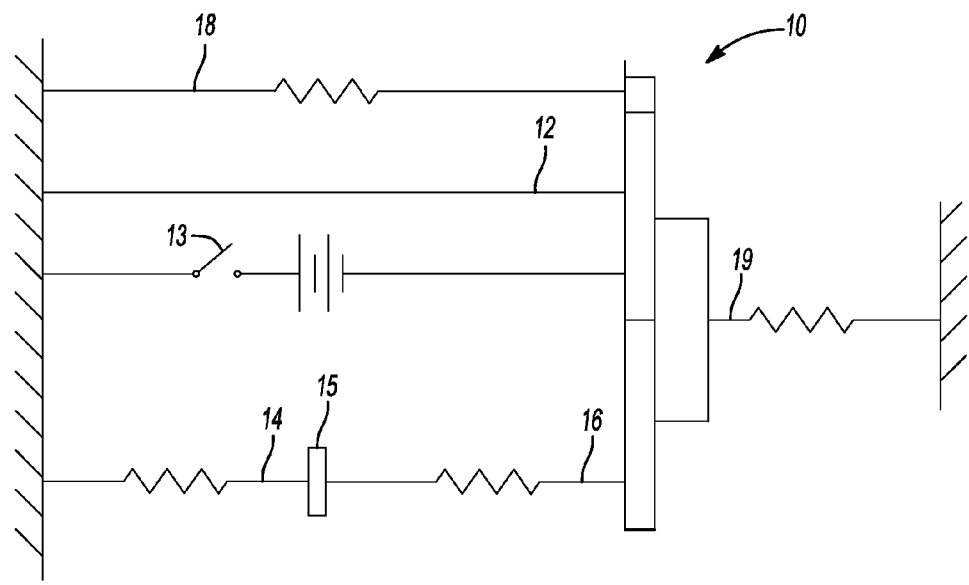
FIG. 1 is a schematic illustration of an actuator with an SMA element and a thermally responsive element that adjusts bias stress.

Referring to the Figures, wherein like reference numbers refer to the same or similar components throughout the several views, FIG. 1 shows an actuator 10 that includes a plurality of bias elements that, as a non-limiting example, includes first, second and third bias elements 14, 16, and 18 where the bias element 18 provides nominal bias stress and bias elements 14, 16 are engaged and disengaged by thermally activated connector 15. When bias elements 14, 16 are engaged via thermally activated connector 15, they increase the bias stress. Nonlimiting examples of suitable bias elements include springs and dead loads, which may be used in any combination with each other. Wire 12 is composed of a first shape memory alloy (SMA). As used herein the term "wire" is non-limiting and shall include other similar geometric configurations presenting tensile load strength/strain capabilities, such as cables, bundles, braids, ropes, strips, chains, ribbons, springs and other elements. SMAs are alloys that demonstrate an ability to return to a previously defined shape and/or size when subjected to an appropriate thermal stimulus. Typically, SMAs are used to perform useful mechanical work. For example, an SMA may be coupled to a load, such as a switch or a mass to be moved, and to an initiating source operable to deliver an activation signal to the SMA.

SMAs are capable of undergoing phase transitions in which their stiffness, dimensions, or shapes are altered as a function of temperature. Generally, in the low temperature or martensite phase, SMAs can be pseudo-plastically deformed. Upon exposure to some higher temperature the deformed SMAs will transform to an austenite phase, or parent phase, returning to their permanent shape. The austenite phase shape may be set during the manufacturing of the SMA element. Materials that exhibit this shape memory effect only upon heating are referred to as having one-way shape memory. Materials that also exhibit shape memory upon re-cooling are referred to as having two-way shape memory behavior, as described further below.

SMAs exist in different temperature-dependent phases. The SMA assumes distinct configurations in the its martensite and austenite phases. When the SMA is in the martensite phase and is heated, it begins to change into the austenite phase. The temperature at which this phenomenon starts is often referred to as austenite start temperature ($A_s$). The temperature at which this phenomenon is complete is called the austenite finish temperature ($A_f$).

When the SMA is in the austenite phase and is cooled, it begins to change into the martensite phase, and the temperature at which this phenomenon starts is referred to as the martensite start temperature ($M_s$). The temperature at which austenite finishes transforming to martensite is called the martensite finish temperature ($M_f$). In view of the foregoing, a suitable activation signal for use with SMAs is a thermal activation signal having a magnitude to cause transformations between the martensite and austenite phases.

Intrinsic and extrinsic two-way shape memory materials are characterized by a shape transition both upon heating from the martensite phase to the austenite phase, as well as an additional shape transition upon cooling from the austenite phase back to the martensite phase. Intrinsic two-way shape memory behavior must be induced in the shape memory material through thermo-mechanical processing. Such procedures include extreme deformation of the material while in the martensite phase, heating-cooling under constraint or load, or surface modification such as laser annealing, polishing, or shot-peening. Once the material has been trained to exhibit the two-way shape memory effect, the shape change between the low and high temperature states is generally reversible and persists through a high number of thermal cycles. In contrast, active materials that exhibit the extrinsic two-way shape memory effects are composite or multi-component materials that combine a SMA composition that exhibits a one-way effect with another element that provides a restoring force to recover the original shape of the composite.

The temperature at which the SMA recovers its permanent shape when heated can be adjusted by slight changes in the composition of the alloy and through heat treatment. In nickel-titanium SMAs, for instance, it can be changed from above about 100° C. to below about −100° C. The shape recovery process occurs over a range of just a few degrees and the start or finish of the transformation can be controlled to within a degree or two depending on the desired application and alloy composition. The mechanical properties of the SMA vary greatly over the temperature range spanning their transformation, typically providing the system with shape memory effects, super-elastic effects, and high damping capacity.

Suitable SMA materials include, without limitation, nickel-titanium based alloys, indium-titanium based alloys, nickel-aluminum based alloys, nickel-gallium based alloys, copper based alloys (e.g., copper-zinc alloys, copper-aluminum alloys, copper-gold, copper-titanium-nickel, and copper-tin alloys), gold-cadmium based alloys, silver-cadmium based alloys, indium-cadmium based alloys, manganese-copper based alloys, iron-platinum based alloys, iron-platinum based alloys, iron-palladium based alloys, and the like. The alloys can be binary, ternary, or any higher order so long as the alloy composition exhibits a shape memory effect, e.g., change in dimension, elastic modulus, damping capacity, and the like. In typical use, SMAs exhibit a modulus increase of about 2.5 times and a dimensional change (recovery of pseudo-plastic deformation induced when in the martensitic phase) of up to about 8% (depending on the amount of pre-strain) when heated above their martensite to austenite phase transition temperature.

As shown in FIG. 1, the initiating source can be an electric power supply (not shown), alternating or direct current to generate thermal energy via resistance in wire 12 toward the passing current when switch 13 is closed. This type of heating is known as resistance or Joule heating. The electric supply may be, for example, a charging system of a vehicle in which actuator 10 is used. A controller (e.g., a computer controller) may be coupled to the electrical source or other source of thermal energy and to the SMA to control actuation of the SMA. When heated, SMA wire 12 in FIG. 1 shortens its length as it passes from its martensite phase into its austenite phase, deforming actuating spring 19 as the transition temperature is reached and exceeded. When it is desired to reset the actuator, the electrical current is stopped and wire 12 is allowed to cool so that it once again may pass through the transition bounded by the martensite start temperature ($M_s$) and the martensite finish temperature ($M_f$), being stretched to its low temperature length by bias elements 14, 16, and 18.

Figure 2A:
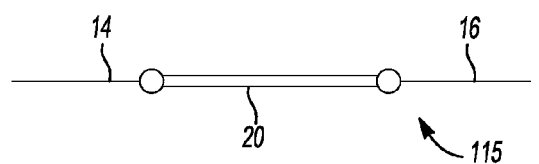
FIGS. 2a-2g are schematic illustrations of various configurations for thermally activated connectors for modifying bias stress at high temperatures.

Thermally activated connector 15 is designed to disengage bias elements 14, 16 as the ambient temperature becomes high enough to disrupt normal actuation of actuator 10 using only bias element 18. Thermally activated connector 15 includes a thermally responsive element such as shown in the embodiments of FIGS. 2a-2g. Thermally activated connector 115 of FIG. 2a is an SMA wire that is connected on one end to bias element 14 and on its other end to bias element 16. Connector-SMA wire 115 has a martensite-to-austenite transition temperature that is lower than the martensite-to-austenite transition temperature of wire 12. In various embodiments, the SMA wire 115 has a martensite-to-austenite transition temperature that is at least 20° C. or in other embodiments that is at least 50° C. lower than the martensite-to-austenite transition temperature of wire 12.

Figure 2B:
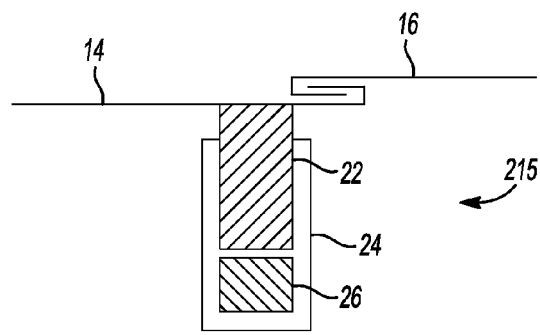

In another embodiment, the thermally responsive element of connector 15 is a thermally active material having a high coefficient of thermal expansion that expands with temperature so that at a desired temperature the expansion causes engagement of bias elements to introduce increased bias stress on wire 12. The thermally active material may have a linear coefficient of thermal expansion of at least 0.001/° C. Ethanol is one example of a material with such a thermal expansion. In another example, a thermally active material may undergo a phase change, which may, for example, cause an expansion of at least 25% in length over a 50° C. temperature span. Paraffin wax is one example of such a phase change material (PCM). FIG. 2b illustrates an embodiment using a thermally active material.

In FIG. 2b the thermally responsive element of connector 215 is a thermally active material 26. The thermally active material 26 and piston 22 are arranged in a housing 24. The thermally active material 26 undergoes a thermal expansion (which may be or include an expansive phase change) at a temperature that is lower than the martensite-to-austenite transition temperature of wire 12. The thermal expansion causes at least a 4% increase in the volume of the thermally active material 26; the volume increase may be much higher. For example, in the case where paraffin wax is employed as the thermally active material 26, the volume increase may be about 100%. The expansion of the thermally active material 26 presses piston 22 against bias element 14, which in turn presses against bias element 16. This action increases the bias stress in actuator 10. The boundary between piston 22 and the thermally active material 26 moves as the thermally active material 26 expands or contracts with change in temperature. As ambient temperature cools, the thermally active material 26 contracts and allows piston 22 to move further into housing 24.

Phase change materials (PCMs) can be used for latent heat storage and release. PCMs have relatively high enthalpy of transformation associated with a change of phase (e.g., latent heats of fusion associated with a change of phase from solid to liquid), and are capable of storing and releasing relatively large amounts of energy. Heat is absorbed or released as the material changes its phase, such as from solid to liquid, liquid to solid, liquid to gas, gas to liquid, and solid to solid. The most commonly used phase change is solid to liquid. Generally, liquid-gas phase changes occur relatively fast and involve a relatively high enthalpy of transformation, and solid-solid phase changes occur relatively slowly and involve a relatively low enthalpy of transformation.

When heating a solid-to-liquid PCM, for example, the PCM initially behaves like a sensible heat storage (SHS) material, with its temperature rising as it absorbs heat. Unlike SHS materials, however, when solid-liquid PCMs reach the temperature at which they change phase, they absorb large amounts of heat while maintaining a nominally constant temperature. The solid-liquid PCM will continue to absorb heat without a significant rise in temperature until all the material is transformed to the liquid phase. Other types of PCMs exhibit similar attributes.

When the temperature of a PCM in its liquid phase is reduced to below the phase-change temperature, the PCM releases its stored latent heat and eventually solidifies if the adjacent temperature is below its melting point.

PCMs store between about five and about fourteen times more heat per unit volume than some heat absorbing materials, such as water, masonry, or rock. PCMs are available with any of a wide variety of phase-change temperatures.

PCMs types include organic PCMs and inorganic PCMs. Organic PCMs include, for example, paraffin ($C_nH_{2n+2}$), such as octadecane, and fatty acids like lauric acid, stearic acid, linoleic acid, oleic acid, and the like. Inorganic PCMs include, for example, metal salt hydrates. Another type of PCM is eutectics, which are a combination of various organic materials or organic and inorganic materials.

Variables for selecting a PCM include thermal characteristics (e.g., heat of fusion per unit volume, specific heat, thermal conductivity/volumetric heat storage rate, heat release rate), kinematic properties (e.g., change of volume, congruency of phase change, congruency of melting, and nucleation (self-nucleating versus nucleating agent needed)), chemical properties (e.g., stability, amount of segregation, full reversibility between phase changes, degradation after a large number of phase-change cycles, and corrosiveness), and economic factors (e.g., cost and availability).

Figure 2C:
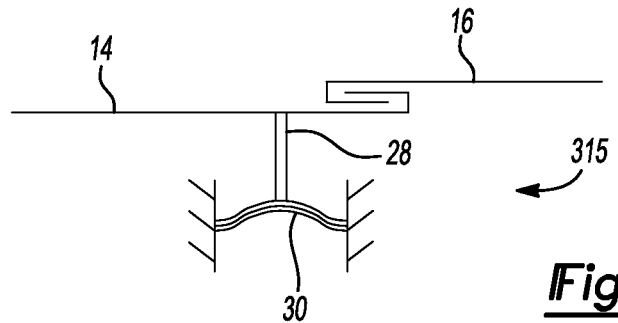

As another example of a connector that uses a thermally responsive element to alter bias stress in actuator 10, FIG. 2c shows as a thermally responsive element of connector 315 a bimetallic element 30. Bimetallic element 30 is configured in a typical belleville washer or snap-through-type bimetallic actuator. As ambient temperature increases to heat bimetallic element 30, bimetallic element snaps through, pulling bias element down by the attachment 28. Bias element 14 in turn pulls bias element 16 down via a latching mechanism joining their respective ends.

FIGS. 2d-2g provide further examples of connectors using thermally responsive elements such as the SMA, materials with high thermal expansions, and bimetallic elements.

Figure 2D:
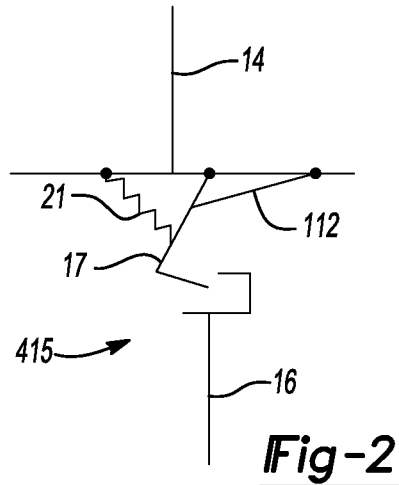
Figure 2E:
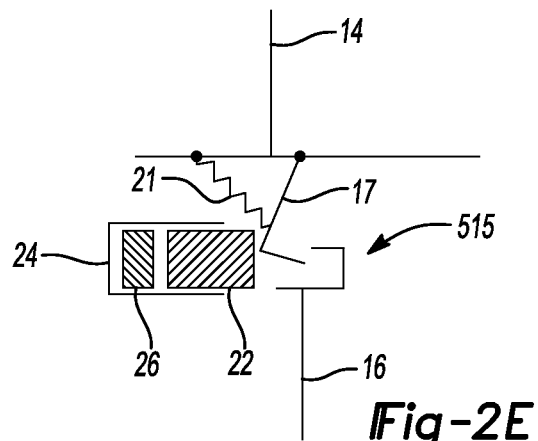

In connector 415 of FIG. 2d, when SMA wire 112 shortens its length as it passes from its martensite phase into its austenite phase, latch 17, which is affixed to an end of bias element 14, is pulled to engage a latch at the end of bias element 16. As the ambient temperature cools and SMA wire 112 resumes its longer length in its martensite phase, a spring 21 pulls latch 17 back to disengage bias element 16.

The connector 515 of FIG. 2e again uses a hinged latch 17 and disconnecting spring 21, but now in combination with the housing 24 containing the thermally active material 26 and piston 22. Again, when the thermally active material 26 undergoes a thermal expansion (which may be or include an expansion due to a phase change) piston 22 moves further out of housing 24 to press latch 17 to engage the end of bias element 16. Again, when the ambient temperature cools causing the thermally active material 26 to contract, the piston 22 moves back into housing 24 and spring 21 draws latch 17 away from bias element 16.

Figure 2F:
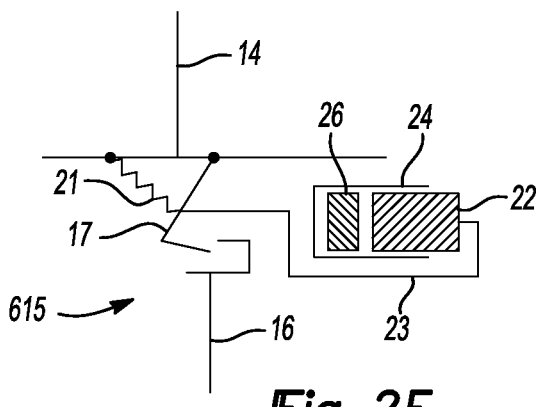

The connector 615 in FIG. 2f uses a rigid connector 23 that is connected at one end to the latch 17 and at its other end to a distal end of piston 22. As thermally active material 26 expands with increasing ambient temperature, the movement of piston 22 out of housing 24 pulls latch 17 to engage bias element 16. As ambient temperature decreases and thermally active material 26 contracts, the movement of piston 22 back into the house pushes latch 17 away from bias element 16, aided by spring 21.

Figure 2G:
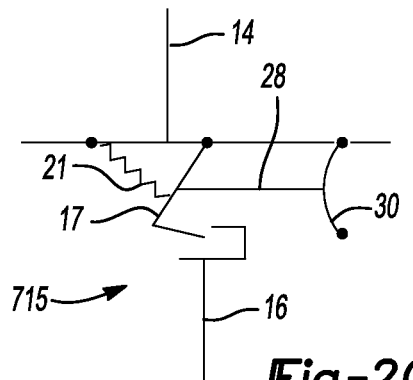

FIG. 2g, similarly to FIG. 2c, uses a bimetallic element 30 configured in a typical belleville washer or snap-through-type bimetallic actuator in connector 715. As ambient temperature increases to heat bimetallic element 30, bimetallic element snaps through, latch 17 via attachment 28 so that latch 17 engages bias element 16. As ambient temperature cools, spring 21 aids in disengaging latch 17.

It should be understood that one may employ the thermally responsive element in many other configurations that are equivalent for the purposes of improving the reliability and responsiveness of actuators at high ambient temperatures. For example, while the several views show a latch of a certain design, any of a number of latch designs or other well-known design details could be used in the inventive connector elements with thermally active material-driven mechanisms.

Figure 3:
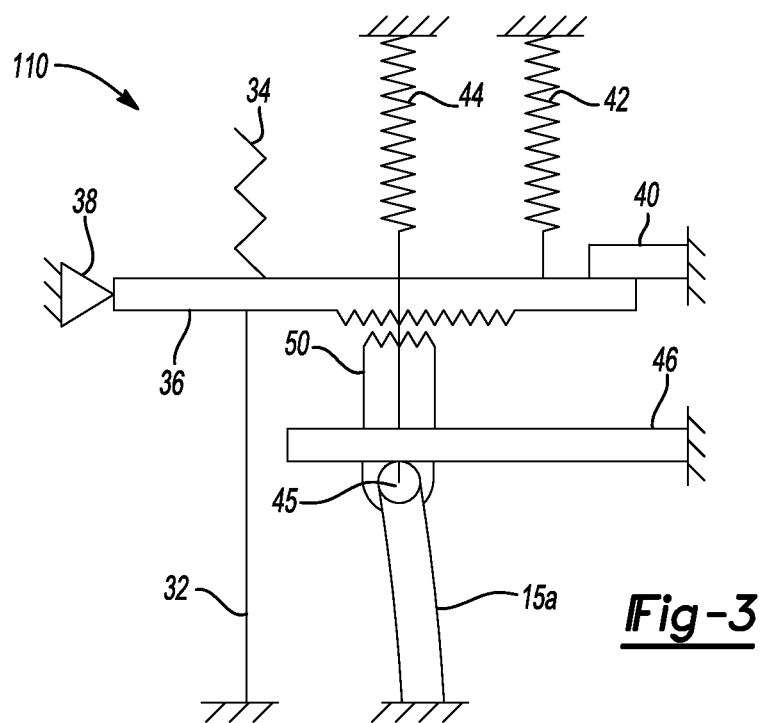
FIG. 3 is another schematic illustration of an actuator with an SMA element.

Actuator 110 of FIG. 3 has an SMA wire 32 that, when heated to its austenite phase, rotates actuator lever 36 away from hinge 38 to actuate an external element through spring 34. Bias element 42 provides nominal bias stress and the bias stress of bias element 44 is adjusted via engagement of the thermally activated connector 15a. At a low temperature the thermally activated connector 15a moves attachment point 45 of bias element 44 closer to the SMA wire 32 to a position with little leverage that minimizes the SMA wire 32 bias stress contributed by bias element 44. SMA wire 32 is in its longer, martensite shape as actuator lever 36 presses against cold stop 40. At a higher ambient temperature, connector 15a is thermally activated to move attachment point 45 further from SMA wire 32, increasing the leverage of bias element 44 over the SMA wire 32. SMA wire shortens in its austenite phase and high-friction interface 48 engages body 50. Low-friction stop 46 and high friction interface 48 allow thermally activated connector 15a to move attachment point 45 without doing much work. Once the SMA wire 32 rotates lever 36 to begin its cycle of actuation attachment point 45 is locked in for reliable operation.

The thermally activated connector 15a may use any of the thermally responsive elements described in connection with FIGS. 21-2g. In various embodiments, connector 15a may include as a thermally responsive element an SMA wire, a thermally active material with a high coefficient of thermal expansion of at least 0.001/° C., a thermally active material selected from phase change materials, or an actuator with a bimetallic element, for example a belleville washer or snap-through-type bimetallic actuator.

Figure 4A:
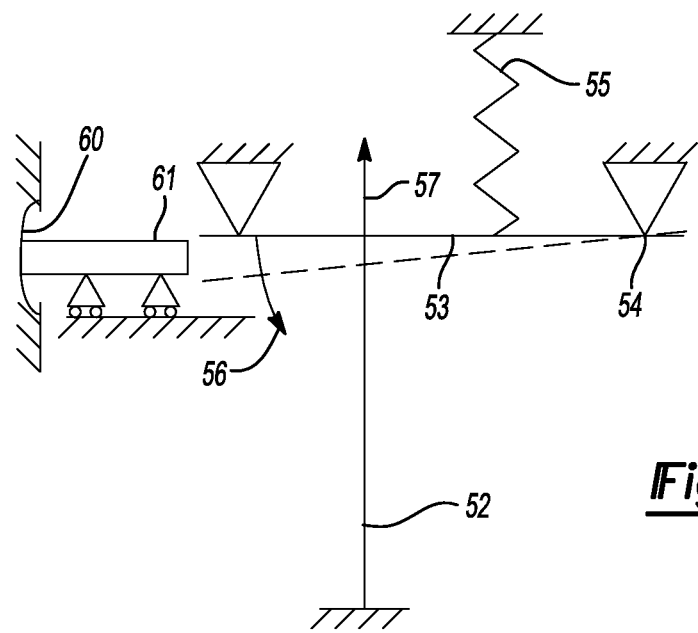
FIGS. 4a and 4b illustrate hot and cold ambient temperature conditions for an actuator including a thermally responsive element that adjusts bias stress.
Figure 4B:
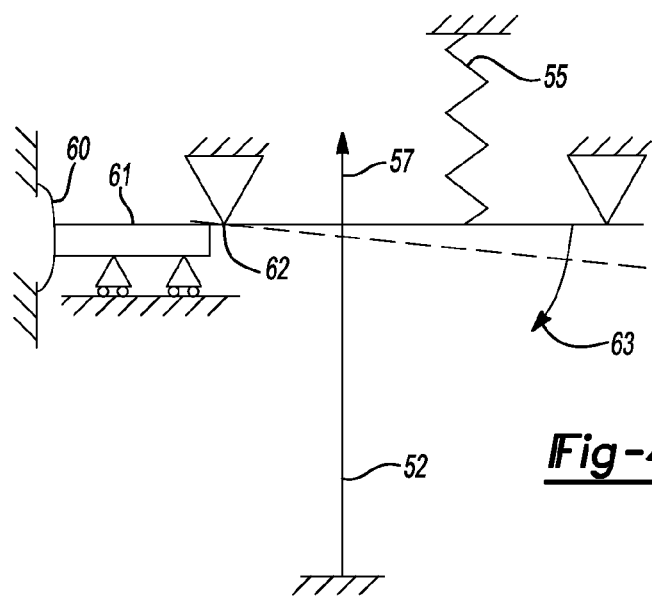

FIGS. 4a and 4b illustrate using a pivot point in a device to increase bias stress on an SMA element. FIG. 4a shows the state of actuator 210 when the ambient temperature is cold. SMA wire 52 is in its longer martensite phase shape. Actuator lever 53 pivots on point 54 as shown by arrow 56. Bias element 55 provides bias stress to the SMA wire 52. Actuator lever 53 does not engage the connector with bimetallic element connector 61.

In 4b the ambient temperature is increased to a point where there is a danger of the device actuating prematurely or failing to reset properly. Now a thermally responsive element, represented by a bimetallic element 60 configured in a typical belleville washer or snap-through-type bimetallic actuator, is actuated by the bimetallic element snapping to contact and underlie an end of SMA wire 52, creating a new pivot point at 62. Thus at hot ambient temperatures the actuator lever 53 pivots in the direction shown by arrow 63, and as it pivots bias spring or element 55 is pulled and stiffens.

Figure 5:
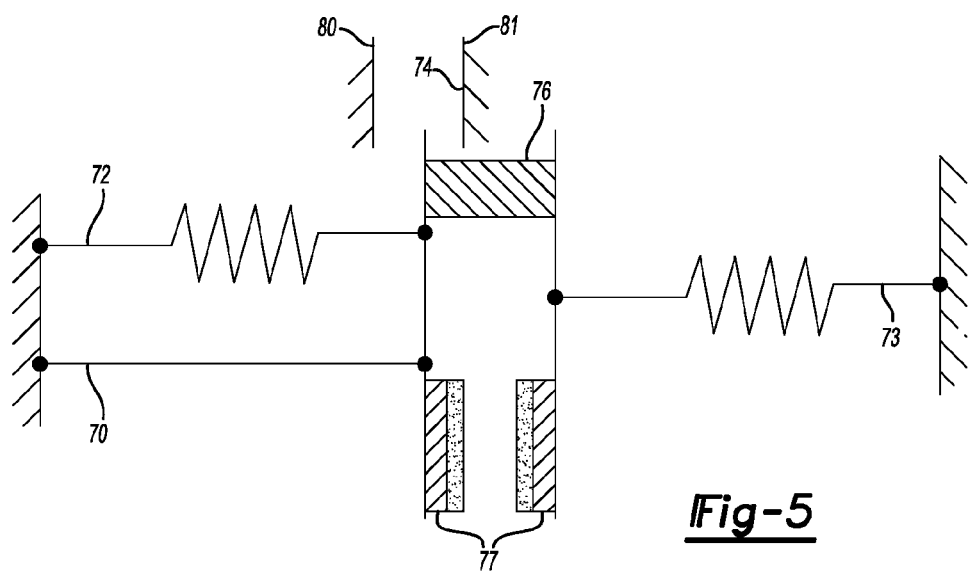
FIG. 5 is a schematic illustration of a further actuator with an SMA element and a thermally responsive element that adjusts bias stress.

Actuator 310 in FIG. 5 has an SMA wire 70 and reset spring 72 fixed in parallel between a common wall and a bias stress element including polymer segment 76 and a pair of magnets 77. The common wall for the SMA wire 70 and the polymer segment 76 can move been a cold stop 81 and a hot stop 80. The SMA wire 70 actuates an external element by increasing bias stress on external bias element 73.

The polymer changes its stiffness at its glass transition temperature when it passes from a glassy state below the glass transition temperature into a molten or rubbery state above its glass transition temperature. In various embodiments, the glass transition temperature is from about 10° C. to about 100° C. below the austenite start temperature ($A_s$) or the martensite start temperature ($M_s$). or both $A_s$ and $M_s$. Similarly, a semi-crystalline polymer changes its stiffness at the melting point temperature for its crystalline domains. In various embodiments, the semi-crystalline polymer has a crystalline melting point from about 10° C. to about 100° C. below the austenite start temperature ($A_s$) or the martensite start temperature ($M_s$). or both $A_s$ and $M_s$. In the actuator 310 shown in FIG. 5, the polymer element 76 has a thermal transition temperature, such as a glass transition temperature or a crystalline melting point temperature, from about 10° C. to about 100° C. below the austenite start temperature ($A_s$) or the martensite start temperature ($M_s$). or both $A_s$ and $M_s$.

At higher temperatures the polymer segment 76 softens and the pair of magnets 77 increase the displacement of the bias element 73. Deformation of the polymer segment and force from the connected bias elements alters the reset spring 72 length and, in turn, its force.

Actuator assemblies as described may be used in a variety of contexts. For example, actuator assemblies may be used in automotive applications, such as fuel injectors, passenger-compartment features (e.g., seat lumbar support control), and door and panel latches.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. An actuator comprising a shape memory alloy (SMA) element and a thermally responsive element that adjusts bias stress, the thermally responsive element comprising a first bias element, a second bias element, and a thermally activated connector disposed between the first bias element and the second bias element that serves to engage and disengage the first bias element from the second bias element based on temperature changes.

2. An actuator according to claim 1, wherein the thermally activated connector comprises a member selected from the group consisting of active materials having a high coefficient of thermal expansion, shape-memory alloys, and bimetallic elements.

3. An actuator according to claim 1, wherein the thermally activated connector comprises a shape memory alloy (SMA) wire.

4. An actuator according to claim 1, wherein the thermally activated connector comprises a thermally activated phase change material.

5. An actuator according to claim 1, wherein the thermally activated connector comprises a thermally activated material and a piston.

6. An actuator according to claim 1, wherein the thermally activated connector comprises a bimetallic element.

7. An actuator according to claim 6, wherein the bimetallic element comprises a Belleville washer or a snap-through-type bimetallic actuator.

8. An actuator comprising:
   a shape memory alloy (SMA) element;
   a nominal bias element that applies bias stress to the SMA element; and
   a thermally responsive element capable of adjusting bias stress applied to the SMA element based on temperature, the thermally responsive element comprising a first bias element, a second bias element, and a thermally activated connector disposed between the first bias element and the second bias element that serves to engage and disengage the first bias element from the second bias element based on temperature changes.

* * * * *